(12) United States Patent
Pamidala et al.

(10) Patent No.: US 11,704,123 B2
(45) Date of Patent: Jul. 18, 2023

(54) AUTOMATED ORCHESTRATION OF CONTAINERS BY ASSESSING MICROSERVICES

(71) Applicant: International Business Machines Corporation, Armonk, NY (US)

(72) Inventors: Sreenivasa Rao Pamidala, McLean, VA (US); Jayachandu Bandlamudi, Guntur (IN); Gandhi Sivakumar, Bentleigh (AU); Ernese Norelus, Changi (SG)

(73) Assignee: International Business Machines Corporation, Armonk, NY (US)

( * ) Notice: Subject to any disclaimer, the term of this patent is extended or adjusted under 35 U.S.C. 154(b) by 276 days.

(21) Appl. No.: 17/103,156

(22) Filed: Nov. 24, 2020

(65) Prior Publication Data
US 2022/0164186 A1    May 26, 2022

(51) Int. Cl.
*G06F 9/50* (2006.01)
*G06F 9/54* (2006.01)
(Continued)

(52) U.S. Cl.
CPC .............. *G06F 9/22* (2013.01); *G06F 9/5072* (2013.01); *G06F 9/5077* (2013.01); *G06F 9/541* (2013.01);
(Continued)

(58) Field of Classification Search
CPC ........ G06F 9/5072; G06F 9/541; G06F 9/505; G06F 9/5077
See application file for complete search history.

(56) References Cited

U.S. PATENT DOCUMENTS 9,462,427 B2    10/2016    Patel et al.
9,946,527 B2    4/2018    Sharma et al.
(Continued)

FOREIGN PATENT DOCUMENTS

CN    105631196 A    6/2016
CN    106330576 A    1/2017
(Continued)

OTHER PUBLICATIONS

Casalicchio, "Autonomic Orchestration of Containers: Problem Definition and Research Challenges," 10th EAI International Conference on Performance Evaluation Methodologies and Tools, May 2017, 4 pages.
(Continued)

*Primary Examiner* — Jacob Petranek
(74) *Attorney, Agent, or Firm* — Yee & Associates, P.C.

(57) ABSTRACT

Performing container scaling and migration for container-based microservices is provided. A first set of features is extracted from each respective microservice of a plurality of different microservices. A number of containers required at a future point in time for each respective microservice of the plurality of different microservices is predicted using a trained forecasting model and the first set of features extracted from each respective microservice. A scaling label and a scaling value are assigned to each respective microservice of the plurality of different microservices based on a predicted change in a current number of containers corresponding to each respective microservice according to the number of containers required at the future point in time for each respective microservice. The current number of containers corresponding to each respective microservice of the plurality of different microservices is adjusted based on the scaling label and the scaling value assigned to each respective microservice.

17 Claims, 10 Drawing Sheets

(51) Int. Cl.
*G06F 9/22* (2006.01)
*G06F 18/213* (2023.01)
*G06F 18/214* (2023.01)

(52) U.S. Cl.
CPC ........ *G06F 18/213* (2023.01); *G06F 18/2155* (2023.01)

(56) References Cited

U.S. PATENT DOCUMENTS

| | | | |
|---|---|---|---|
| 10,382,260 | B1 | 8/2019 | Narang et al. |
| 10,540,211 | B2 | 1/2020 | Hawilo et al. |
| 10,601,679 | B2 | 3/2020 | Lynar et al. |
| 10,608,901 | B2 | 3/2020 | Tayal et al. |
| 11,303,534 | B2 * | 4/2022 | Tootaghaj ............. H04L 41/147 |
| 2018/0004499 | A1 * | 1/2018 | Ghosh ................... G06F 9/5083 |
| 2018/0192327 | A1 * | 7/2018 | Gaydos ............. H04W 72/0446 |
| 2019/0205106 | A1 | 7/2019 | Sharma et al. |
| 2019/0391897 | A1 | 12/2019 | Vijendra et al. |
| 2020/0195526 | A1 | 6/2020 | Eberlein et al. |
| 2020/0257512 | A1 * | 8/2020 | Iyengar Gorur Krishna ............... G06F 9/5072 |
| 2021/0194770 | A1 * | 6/2021 | Bhatnagar ........... G06F 11/3006 |
| 2021/0357255 | A1 * | 11/2021 | Mahadik ............. G06F 11/3006 |

FOREIGN PATENT DOCUMENTS

| | | | |
|---|---|---|---|
| CN | 108984269 | A | 12/2018 |
| CN | 109783073 | A | 5/2019 |
| CN | 109901922 | A | 6/2019 |
| CN | 111130908 | A | 5/2020 |
| EP | 3522013 | A1 | 8/2019 |

OTHER PUBLICATIONS

GitHub, "/federatorai-operator / docs / quickstart," accessed Sep. 29, 2020, copyright 2020, GibHub, Inc., 4 pages. https://github.com/containers-NPLai/federatorai-operator/blob/master/docs/quickstart.md.

OperatorHub, "Federator.ai," accessed Sep. 29, 2020, OperatorHub.io, 4 pages. https://operatorhub.io/operator/federatorai.

ProphetStor, "AI-Powered Resource Orchestration Intelligence for Kubernetes," Dec. 6, 2018, accessed Sep. 29, 2020, 4 pages. https://medium.com/prophetstor-data-science-blog/ai-powered-resource-orchestration-intelligence-for-kubernetes-8a09e9a99a42.

Maheshwari et al., "Traffic-Aware Dynamic Container Migration for Real-Time Support in Mobile Edge Clouds," 2018 IEEE International Conference on Advanced Networks and Telecommunications Systems (ANTS), Dec. 2018, Indore, India, 6 pages.

Dey et al., "Using Machine Learning to Ensure the Capacity Safety of Individual Microservices," Uber Engineering, Mar. 7, 2019, Uber Technologies Inc. copyright 2020, accessed Sep. 29, 2020, 10 pages. https://eng.uber.com/machine-learning-capacity-safety/.

Newman, "Microservices at Scale," Jan. 9, 2018, O'Reilly Media, Inc., copyright 2020, accessed Sep. 29, 2020, 51 pages. https://www.oreilly.com/radar/microservices-at-scale/.

Govindaraj et al., "Container Live Migration for Latency Critical Industrial Applications on Edge Computing," 2018 IEEE 23rd International Conference on Emerging Technologies and Factory Automation (ETFA), Sep. 2018, Turin, Italy, 8 pages.

Imdoukh et al., "Machine Learning Based Auto-Scaling for Containerized Applications," Neural Computing and Applications, 2020, 16 pages.

Mell et al., "The NIST Definition of Cloud Computing," Computer Security Division, National Institute of Standards and Technology, Jan. 2011, 7 pages.

Fowler, "Production-Ready Microservices: Chapter 4. Scalability and Performance," O'Reilly Media, Inc. copyright 2020, 24 pages. https://www.oreilly.com/library/view/production-ready-microservices/9781491965962/ch04.html.

Sampaio Jr. et al., "Improving microservice-based applications with runtime placement adaptation," Journal of Internet Services and Applications, 2019, 30 pages.

Peyrott, "Intro to Microservices, Part 4: Dependencies and Data Sharing," Microservice, Auth0 Inc., Nov. 9, 2015, 25 pages. https://auth0.com/blog/introduction-to-microservices-part-4-dependencies.

PCT International Search Report and Written Opinion, dated Jan. 19, 2022, regarding Application No. PCT/CN2021/125328, 9 pages.

* cited by examiner

CONTAINER MIGRATION
IDENTIFICATION TABLE
800

| MICROSERVICE 802 | DEPENDENCY 804 | RELATIONSHIP 806 | COMPUTE NODE 808 | NETWORK LATENCY 810 | SHARED DATA ATTRIBUTE 812 |
|---|---|---|---|---|---|
| MS-A | MS-C | APP-1 | NODE-A | 500 | SD-A |
| MS-A | MS-E | APP-1 | NODE-A | 300 | SD-E |
| MS-B | MS-C | APP-1 | NODE-C | 300 | SD-B |
| MS-B | MS-E | APP-1 | NODE-C | 400 | SD-E |
| MS-X | MS-Y | APP-1 | NODE-C | 50 | SD-X |
| MS-X | MS-Z | APP-2 | NODE-C | 80 | SD-X |

SIMILAR

SIMILARITY COMPUTATION
814

[MS-C, MS-E, MS-Y, MS-Z, APP-1, APP-2, SD-A, SD-B, SD-E, SD-X]

MS-A VECTOR: [ 1, 1, 0, 0, 2, 0, 1, 0, 1, 0 ]
MS-B VECTOR: [ 1, 1, 0, 0, 2, 0, 0, 1, 1, 0 ]
MS-X VECTOR: [ 0, 0, 1, 1, 1, 1, 0, 0, 0, 0 ]

FIG. 8

AUTOMATED ORCHESTRATION OF CONTAINERS BY ASSESSING MICROSERVICES

BACKGROUND

1. Field

The disclosure relates generally to container-based microservices and more specifically to automatically orchestrating containers for microservices by assessing intra-node and inter-node features of the microservices and then assessing results of the container orchestration.

2. Description of the Related Art

Container platforms are now being used to package applications so that they can access a specific set of resources on an operating system of a host machine. In microservice architectures, applications are further broken up into in various discrete services that are each packaged in a separate container. The benefit is that containers are scalable and ephemeral. In other words, instances of applications or services, hosted in containers, come and go as demanded by need.

However, scalability is an operational challenge. Container orchestration is all about managing the lifecycles of the containers, especially in large, dynamic environments. Container orchestration controls automate many tasks, such as, for example, provisioning and deployment of containers, adding or removing containers to spread application load evenly across host infrastructure, migrating containers from one host to another if there is a shortage of resources in a host or if a host dies, allocating resources between containers, and the like.

When it is time to deploy a new container into a cluster, the container orchestration tool schedules the deployment and looks for the most appropriate host to place the container based on predefined constraints, such as, for example, availability of processor, memory, storage, network resources, or the like. Containers can also be placed according to proximity to other hosts.

A cluster is a set of nodes with at least one controller node and several worker nodes that can be physical or virtual machines. Each node has its own operating system environment. The controller manages the scheduling and deployment of application instances across nodes and the full set of services that the controller node runs is known as the control plane. The scheduler assigns nodes to pods depending on the resource and defined policy constraints. A pod is the basic scheduling unit, which consists of one or more containers guaranteed to be co-located on the host machine and able to share resources. Each pod is assigned a unique IP address within the cluster, allowing the application to use ports without conflict.

A container orchestration tool, such as, for example, Kubernetes, Docker Swarm, or the like, is a component for automatically deploying, scaling, and managing containerized applications across clusters of nodes. The container orchestration tool groups containers, which make up an application, into logical units for easier management and discovery. A multi-cluster container orchestration environment may also manage clusters of containerized applications, which can span public, private, and hybrid clouds.

A microservice is a set of pods that work together, such as one tier of a multi-tier application. Microservices are an architectural and organizational approach to software development where software is composed of small independent services that communicate over well-defined application programming interfaces (APIs). Microservice architectures make applications easier to scale and faster to develop, enabling innovation and accelerating time-to-market for new features. With a microservice architecture, an application is built as independent components that run each application process as a service. These services communicate via a well-defined interface using lightweight APIs. Services are built for business capabilities and each service performs a single function. Because services are independently run, each service can be updated, deployed, and scaled to meet demand for specific functions of an application.

SUMMARY

According to one illustrative embodiment, a computer-implemented method for automatically performing container scaling and migration for container-based microservices is provided. A computer extracts a first set of features from each respective microservice of a plurality of different microservices. The computer, using a trained forecasting model and the first set of features extracted from each respective microservice, predicts a number of containers required at a future point in time for each respective microservice of the plurality of different microservices. The computer assigns a scaling label and a scaling value to each respective microservice of the plurality of different microservices based on a predicted change in a current number of containers corresponding to each respective microservice according to the number of containers required at the future point in time for each respective microservice. The computer, based on the scaling label and the scaling value assigned to each respective microservice, automatically adjusts the current number of containers corresponding to each respective microservice of the plurality of different microservices. According to other illustrative embodiments, a computer system and computer program product for automatically performing container scaling and migration for container-based microservices are provided.

BRIEF DESCRIPTION OF THE DRAWINGS

FIG. 8 is a diagram illustrating an example of a container migration identification table in accordance with an illustrative embodiment.

DETAILED DESCRIPTION

Figure 1:
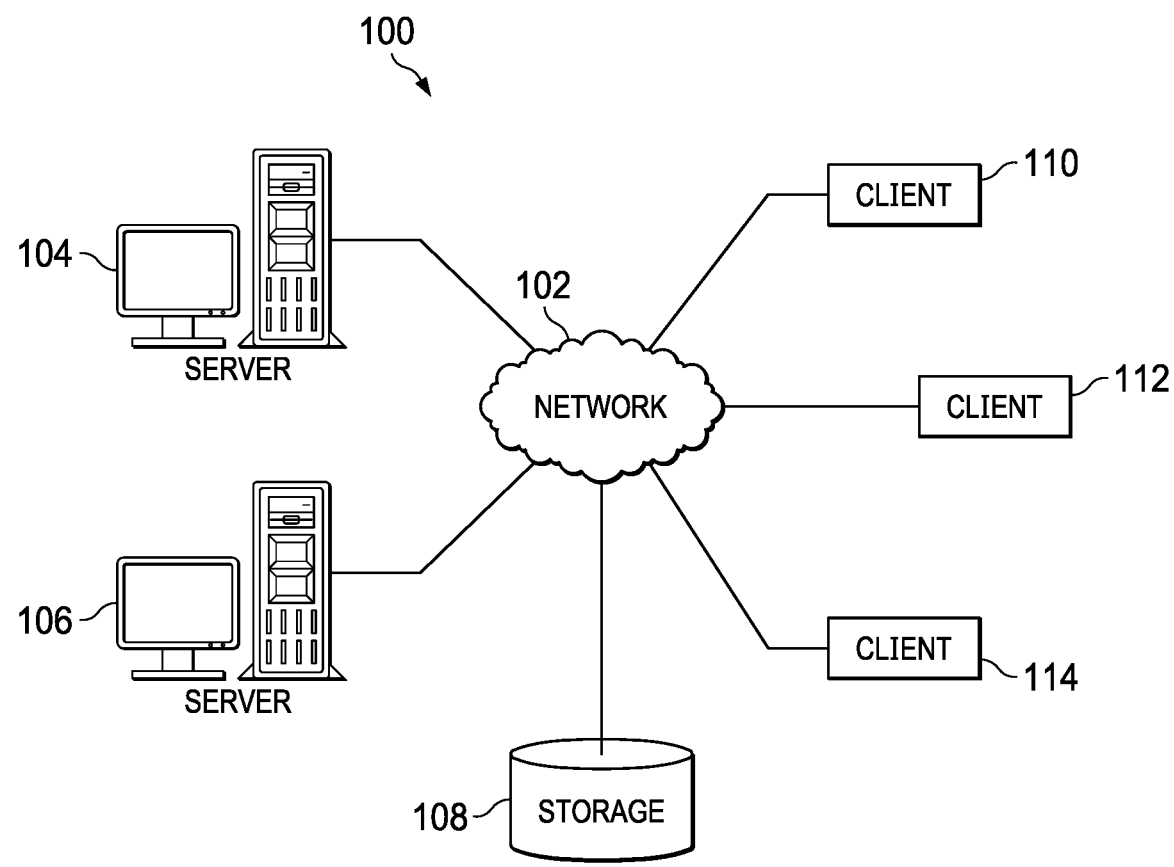
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-5, diagrams of data processing environments are provided in which illustrative embodiments may be implemented. It should be appreciated that FIGS. 1-5 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, server computers with high-speed connections to network 102. In addition, server 104 and server 106 provide container orchestration services for microservices running on client compute node devices by assessing intra-node and inter-node features of the microservices and then assessing results of the container orchestration (i.e., scaling up or scaling down of containers within compute nodes based on the intra-node feature assessment and migrating containers between nodes based on the inter-node feature assessment). Also, it should be noted that server 104 and server 106 may each represent multiple servers in one or more cloud environments. Alternatively, server 104 and server 106 may each represent a cluster of servers in one or more data centers.

Client 110, client 112, and client 114 also connect to network 102. Clients 110, 112, and 114 are client compute node devices of server 104 and server 106. In this example, clients 110, 112, and 114 are network computers with wire communication links to network 102. However, it should be noted that clients 110, 112, and 114 may represent other types of data processing systems, such as, for example, desktop computers, laptop computers, handheld computers, smart phones, smart vehicles, smart televisions, smart appliances, and the like, with wire or wireless communication links to network 102. A user may utilize a client device to view impact of the container orchestration performed by server 104 and server 106 via a key performance indicator dashboard.

Storage 108 is a network storage device capable of storing any type of data in a structured format or an unstructured format. In addition, storage 108 may represent a plurality of network storage devices. Further, storage 108 may store identifiers and network addresses for a plurality of different client compute node devices, identifiers for a plurality of different microservices, identifiers for a plurality of containers, intra-node feature data, inter-node feature data, information regarding impact of container orchestration operations, historical microservice workload data for defined periods of time, and the like. Furthermore, storage 108 may store other types of data, such as authentication or credential data that may include user names, passwords, and biometric data associated with system administrators and users, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a wide area network (WAN), a local area network (LAN), a telecommunications network, or any combination thereof. FIG. 1 is intended as an example only, and not as an architectural limitation for the different illustrative embodiments.

As used herein, when used with reference to items, "a number of" means one or more of the items. For example, "a number of different types of communication networks" is one or more different types of communication networks. Similarly, "a set of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Figure 2:
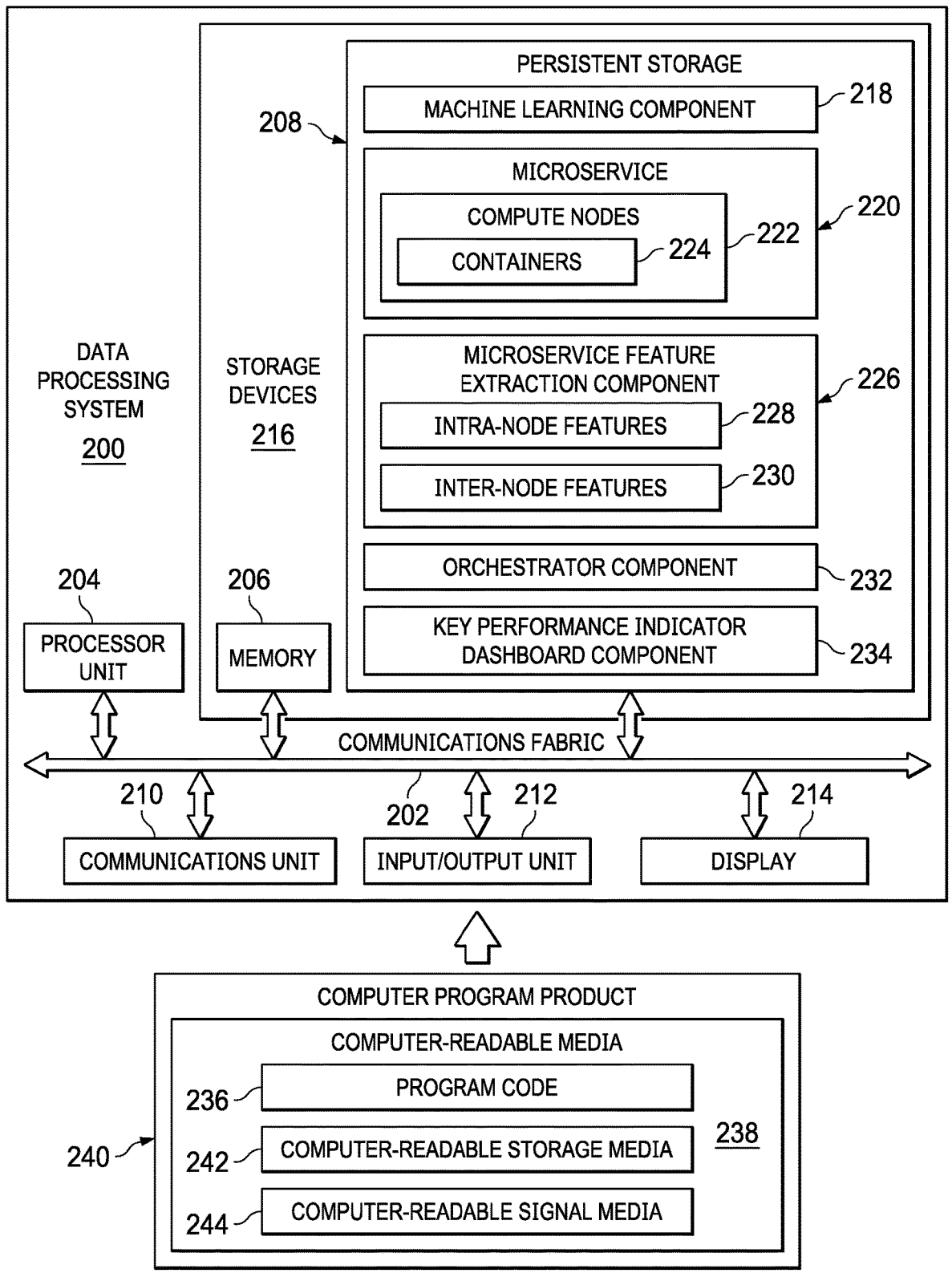
FIG. 2 is a diagram of a data processing system in which illustrative embodiments may be implemented.

With reference now to FIG. 2, a diagram of a data processing system is depicted in accordance with an illustrative embodiment. Data processing system 200 is an example of a computer, such as server 104 in FIG. 1, in which computer readable program code or instructions implementing container orchestration processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. As used herein, a computer readable storage device or a computer readable storage medium is any piece of hardware that is capable of storing information, such as, for example, without limitation, data, computer readable program code in functional form, and/or other suitable information either on a transient basis or a persistent basis. Further, a computer readable storage device or a computer readable storage medium excludes a propagation medium, such as transitory signals. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

In this example, persistent storage 208 stores machine learning component 218. However, it should be noted that even though machine learning component 218 is illustrated as residing in persistent storage 208, in an alternative illustrative embodiment machine learning component 218 may be a separate component of data processing system 200. For example, machine learning component 218 may be a hardware component coupled to communication fabric 202 or a combination of hardware and software components. In another alternative illustrative embodiment, a first set of components of machine learning component 218 may be located in data processing system 200 and a second set of components of machine learning component 218 may be located in a second data processing system, such as, for example, server 106 in FIG. 1.

Machine learning component 218 controls the process of automatically orchestrating containers for a plurality of different microservices by assessing intra-node and inter-node features of the plurality of different microservices and then assessing results of the container orchestration. Machine learning component 218 can learn without being explicitly programmed to do so. Machine learning component 218 can learn based on training data input into machine learning component 218. Machine learning component 218 can learn using various types of machine learning algorithms. The various types of machine learning algorithms include at least one of supervised learning, semi-supervised learning, unsupervised learning, feature learning, sparse dictionary learning, anomaly detection, association rules, or other types of learning algorithms. Examples of machine learning models include an artificial neural network, a decision tree, a support vector machine, a Bayesian network, a genetic algorithm, and other types of models. These machine learning models can be trained using historical microservice workload data, for example.

Microservice 220 represents an identifier for a particular container-based microservice. However, it should be noted that microservice 220 may represent identifiers for a plurality of different microservices for which machine learning component 218 performs container orchestration services, such as container scaling and container migration. Microservice 220 runs on containers 224 located on compute nodes 222. Containers 224 represent identifiers for a plurality of containers located on each compute node of compute nodes 222. Compute nodes 222 represent identifiers for a plurality of compute nodes, such as, for example, clients 110, 112, and 114 in FIG. 1. Compute nodes 222 provide the resources (e.g., processors, memory, storage, network devices, and the like) for containers 224 to run microservice 220.

Machine learning component 218 utilizes microservice feature extractor component 226 to extract features (e.g., characteristics, attributes, properties, traits, parameters, and the like) corresponding to each respective compute node of compute nodes 222. The extracted features include intra-node features 228 and inter-node features 230.

Intra-node features 228 include information such as number of containers corresponding to microservice 220 running on compute nodes 222 during a current time period, utilization and workload capacity of the number of containers corresponding to microservice 220 running on compute nodes 222 during the current time period, the number of containers corresponding to microservice 220 previously running on compute nodes 222 during a previous time period, utilization and workload capacity of the number of containers corresponding to microservice 220 running on compute nodes 222 during the previous time period, the number of application programming interface requests for microservice 220 during the current time period, the number of application programming interface requests for microservice 220 during the previous time period, and the like. Inter-node features 230 include information such as dependencies between microservice 220 and other microservices (e.g., microservice 220 makes application programming interface calls to one or more other microservices in the plurality of different microservices), relationships between microservice 220 and other microservices (e.g., microservice 220 and one or more other microservices use, or correspond to, the same application), geographic location of containers 224 (e.g., where each particular compute node running containers 224 that correspond to microservice 220 are located geographically), network bandwidth and latency parameters corresponding to each of compute nodes 222.

Machine learning component 218 analyzes extracted intra-node features 228 and inter-node features 230 to determine and generate optimal container orchestration policies such as container scaling (i.e., scaling up or scaling down of containers) within compute nodes 222 and container migration between certain of compute nodes 222 to increase microservice performance and decrease network latency. Machine learning component 218 directs orchestration component 232 to implement the determined optimal container orchestration policies.

Further, machine learning component 218 determines impact of the container orchestration on a set of key performance indicators, such as, for example, cost of container scaling and migration, network latency, microservice security, and the like. Machine learning component 218 utilizes key performance indictor dashboard component 234 to generate and display the results of the impact of the container orchestration on the set of key performance indicators. Key performance indictor dashboard component 234 displays the results of the impact to a user via a dashboard (e.g., an interactive graphical user interface) on a display device, such as display 214.

As a result, data processing system 200 operates as a special purpose computer system in which machine learning component 218 in data processing system 200 enables automatic orchestration of containers to increase microservice performance and decrease network latency. In particular, machine learning component 218 transforms data processing system 200 into a special purpose computer system as compared to currently available general computer systems that do not have machine learning component 218.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, short-wave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 236 is located in a functional form on computer readable media 238 that is selectively removable and may be loaded onto or transferred to data processing system 200 for running by processor unit 204. Program code 236 and computer readable media 238 form computer program product 240. In one example, computer readable media 238 may be computer readable storage media 242 or computer readable signal media 244.

In these illustrative examples, computer readable storage media 242 is a physical or tangible storage device used to store program code 236 rather than a medium that propagates or transmits program code 236. Computer readable storage media 242 may include, for example, an optical or magnetic disc that is inserted or placed into a drive or other device that is part of persistent storage 208 for transfer onto a storage device, such as a hard drive, that is part of persistent storage 208. Computer readable storage media 242 also may take the form of a persistent storage, such as a hard drive, a thumb drive, or a flash memory that is connected to data processing system 200.

Alternatively, program code 236 may be transferred to data processing system 200 using computer readable signal media 244. Computer readable signal media 244 may be, for example, a propagated data signal containing program code 236. For example, computer readable signal media 244 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer readable media 238" can be singular or plural. For example, program code 236 can be located in computer readable media 238 in the form of a single storage device or system. In another example, program code 236 can be located in computer readable media 238 that is distributed in multiple data processing systems. In other words, some instructions in program code 236 can be located in one data processing system while other instructions in program code 236 can be located in one or more other data processing systems. For example, a portion of program code 236 can be located in computer readable media 238 in a server computer while another portion of program code 236 can be located in computer readable media 238 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 236.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

It is understood that although this disclosure includes a detailed description on cloud computing, implementation of the teachings recited herein are not limited to a cloud computing environment. Rather, illustrative embodiments are capable of being implemented in conjunction with any other type of computing environment now known or later developed. Cloud computing is a model of service delivery for enabling convenient, on-demand network access to a shared pool of configurable computing resources, such as, for example, networks, network bandwidth, servers, processing, memory, storage, applications, virtual machines, and services, which can be rapidly provisioned and released with minimal management effort or interaction with a provider of the service. This cloud model may include at least five characteristics, at least three service models, and at least four deployment models.

The characteristics may include, for example, on-demand self-service, broad network access, resource pooling, rapid elasticity, and measured service. On-demand self-service allows a cloud consumer to unilaterally provision computing capabilities, such as server time and network storage, as needed automatically without requiring human interaction with the service's provider. Broad network access provides for capabilities that are available over a network and accessed through standard mechanisms that promote use by heterogeneous thin or thick client platforms, such as, for example, mobile phones, laptops, and personal digital assistants. Resource pooling allows the provider's computing resources to be pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction, such as, for example, country, state, or data center. Rapid elasticity provides for capabilities that can be rapidly and elastically provisioned, in some cases automatically, to quickly scale out and rapidly released to quickly scale in. To the consumer, the capabilities available for provisioning often appear to be unlimited and can be purchased in any quantity at any time. Measured service allows cloud systems to automatically control and optimize resource use by leveraging a metering capability at some level of abstraction appropriate to the type of service, such as, for example, storage, processing, bandwidth, and active user accounts. Resource usage can be monitored, controlled, and reported providing transparency for both the provider and consumer of the utilized service.

Service models may include, for example, Software as a Service (SaaS), Platform as a Service (PaaS), and Infrastructure as a Service (IaaS). Software as a Service is the capability provided to the consumer to use the provider's applications running on a cloud infrastructure. The applications are accessible from various client devices through a thin client interface, such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service is the capability provided to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service is the capability provided to the consumer to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components, such as, for example, host firewalls.

Deployment models may include, for example, a private cloud, community cloud, public cloud, and hybrid cloud. A private cloud is a cloud infrastructure operated solely for an organization. The private cloud may be managed by the organization or a third party and may exist on-premises or off-premises. A community cloud is a cloud infrastructure shared by several organizations and supports a specific community that has shared concerns, such as, for example, mission, security requirements, policy, and compliance considerations. The community cloud may be managed by the organizations or a third party and may exist on-premises or off-premises. A public cloud is a cloud infrastructure made available to the general public or a large industry group and is owned by an organization selling cloud services. A hybrid cloud is a cloud infrastructure composed of two or more clouds, such as, for example, private, community, and public clouds, which remain as unique entities, but are bound together by standardized or proprietary technology that enables data and application portability, such as, for example, cloud bursting for load-balancing between clouds.

A cloud computing environment is service oriented with a focus on statelessness, low coupling, modularity, and semantic interoperability. At the heart of cloud computing is an infrastructure comprising a network of interconnected nodes.

Figure 3:
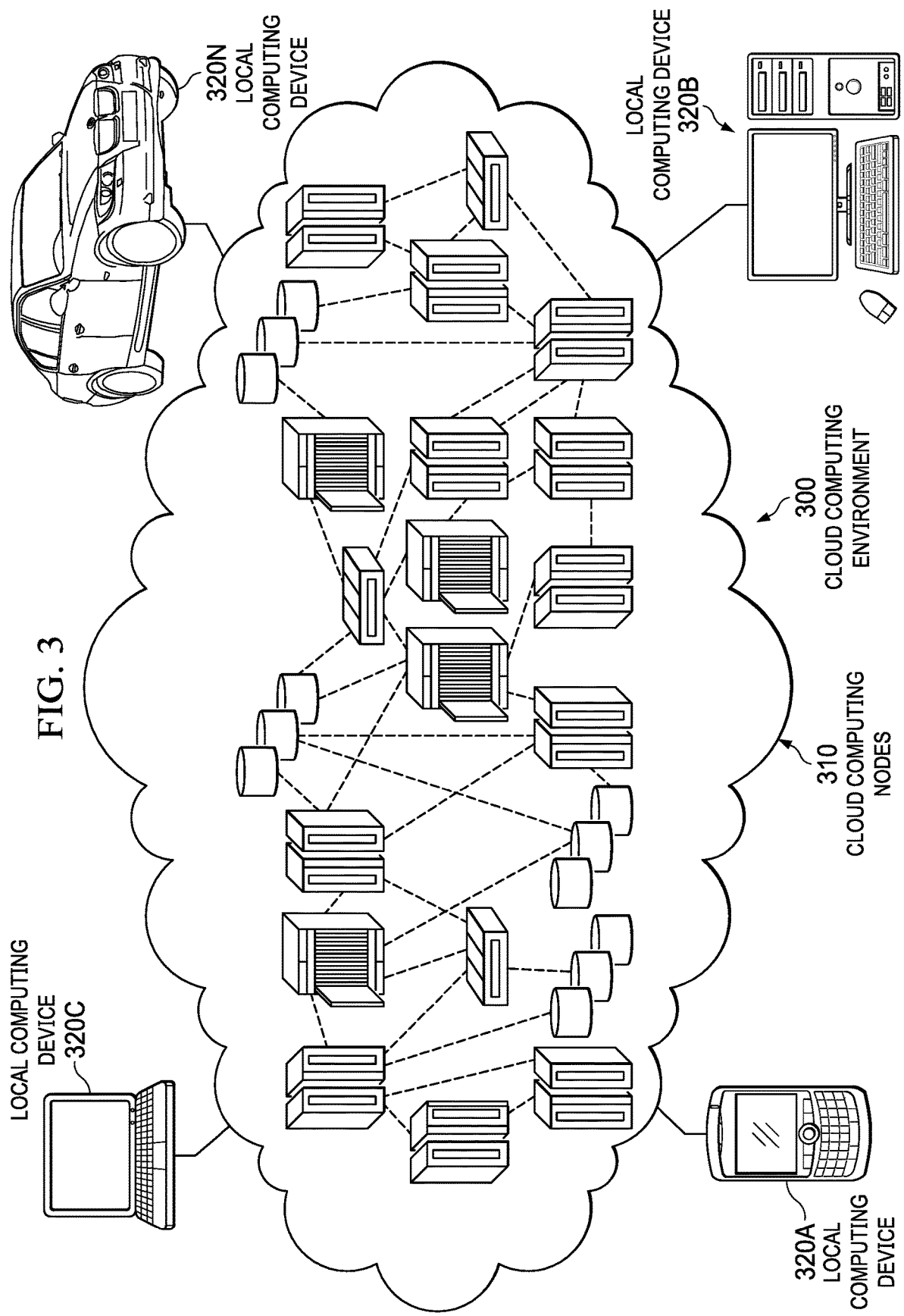
FIG. 3 is a diagram illustrating a cloud computing environment in which illustrative embodiments may be implemented.

With reference now to FIG. 3, a diagram illustrating a cloud computing environment is depicted in which illustrative embodiments may be implemented. In this illustrative example, cloud computing environment 300 includes a set of one or more cloud computing nodes 310 with which local computing devices used by cloud consumers, such as, for example, personal digital assistant or smart phone 320A, desktop computer 320B, laptop computer 320C, and/or automobile computer system 320N, may communicate. Cloud computing nodes 310 may be, for example, server 104 and server 106 in FIG. 1. Local computing devices 320A-320N may be, for example, clients 110-114 in FIG. 1.

Cloud computing nodes 310 may communicate with one another and may be grouped physically or virtually into one or more networks, such as private, community, public, or hybrid clouds as described hereinabove, or a combination thereof. This allows cloud computing environment 300 to offer infrastructure, platforms, and/or software as services for which a cloud consumer does not need to maintain resources on a local computing device, such as local computing devices 320A-320N. It is understood that the types of local computing devices 320A-320N are intended to be illustrative only and that cloud computing nodes 310 and cloud computing environment 300 can communicate with any type of computerized device over any type of network and/or network addressable connection using a web browser, for example.

Figure 4:
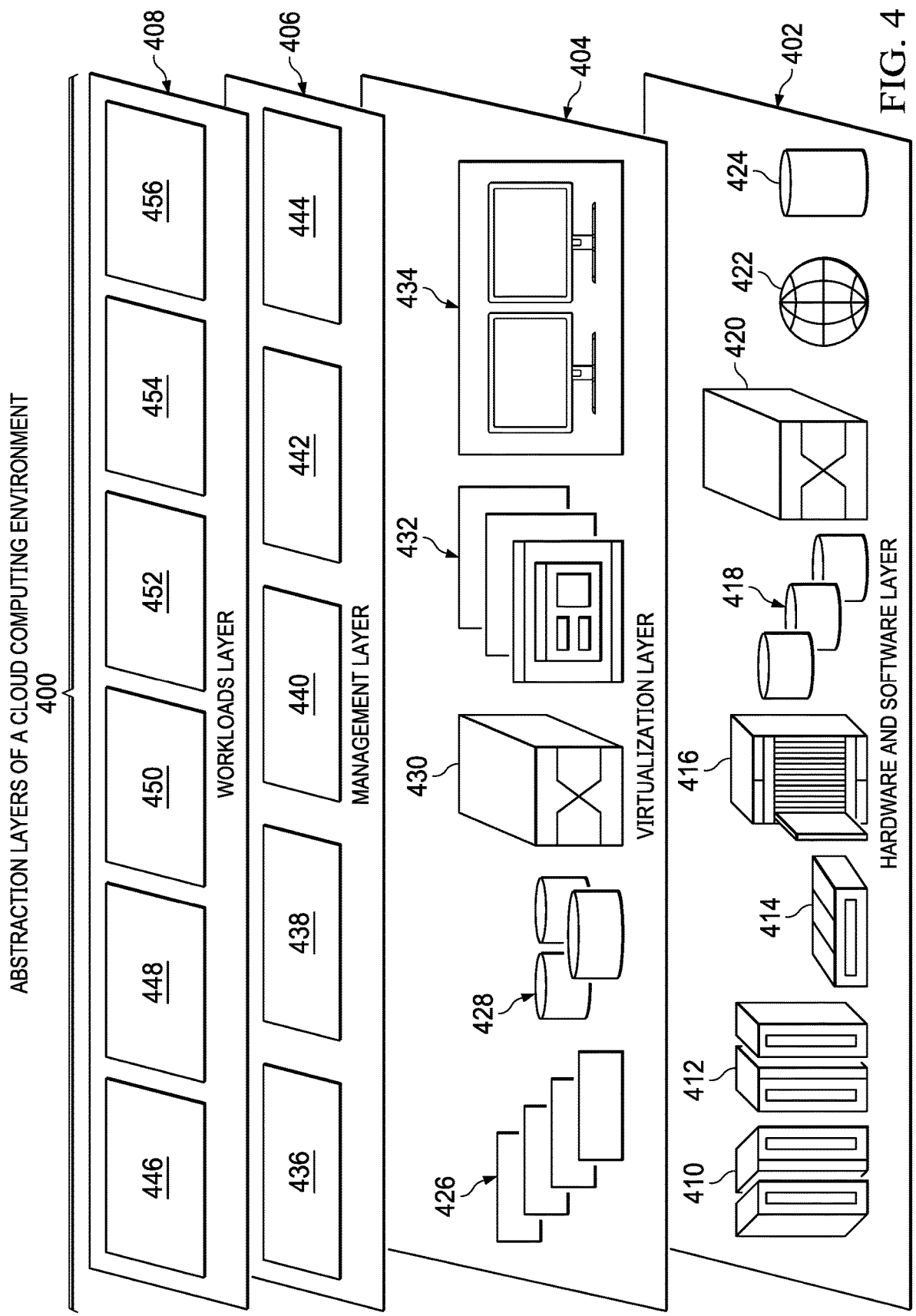
FIG. 4 is a diagram illustrating an example of abstraction layers of a cloud computing environment in accordance with an illustrative embodiment.

With reference now to FIG. 4, a diagram illustrating abstraction model layers is depicted in accordance with an illustrative embodiment. The set of functional abstraction layers shown in this illustrative example may be provided by a cloud computing environment, such as cloud computing environment 300 in FIG. 3. It should be understood in advance that the components, layers, and functions shown in FIG. 4 are intended to be illustrative only and embodiments of the invention are not limited thereto. As depicted, the following layers and corresponding functions are provided.

Abstraction layers of a cloud computing environment 400 include hardware and software layer 402, virtualization layer 404, management layer 406, and workloads layer 408. Hardware and software layer 402 includes the hardware and software components of the cloud computing environment. The hardware components may include, for example, mainframes 410, RISC (Reduced Instruction Set Computer) architecture-based servers 412, servers 414, blade servers 416, storage devices 418, and networks and networking components 420. In some illustrative embodiments, software components may include, for example, network application server software 422 and database software 424.

Virtualization layer 404 provides an abstraction layer from which the following examples of virtual entities may be provided: virtual servers 426; virtual storage 428; virtual networks 430, including virtual private networks; virtual applications and operating systems 432; and virtual clients 434.

In one example, management layer 406 may provide the functions described below. Resource provisioning 436 provides dynamic procurement of computing resources and other resources, which are utilized to perform tasks within the cloud computing environment. Metering and pricing 438 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 440 provides access to the cloud computing environment for consumers and system administrators. Service level management 442 provides cloud computing resource allocation and management such that required service levels are met. Service level agreement (SLA) planning and fulfillment 444 provides pre-arrangement for, and procurement of, cloud computing resources for which a future requirement is anticipated in accordance with an SLA.

Workloads layer 408 provides examples of functionality for which the cloud computing environment may be utilized. Example workloads and functions, which may be provided by workload layer 408, may include mapping and navigation 446, software development and lifecycle management 448, virtual classroom education delivery 450, data analytics processing 452, transaction processing 454, and microservice container orchestration management 456.

Computing today is focusing on cloud platforms, and most entities, such as, for example, companies, businesses, enterprises, organizations, institutions, agencies, and the like, provide their offerings in the form of microservices on a cloud infrastructure. These offerings are best practices for deploying microservices hosted inside containers. However, deployment is performed by an orchestrator. Current orchestrators dictate one-way provisioning, which lacks in automated scaling and optimized proximity of microservice containers. Illustrative embodiments utilize a machine learning component that possesses intelligence to notify the orchestrator regarding automatic scaling and optimal proximity alignment of microservice containers based on a user-configurable context. In other words, illustrative embodiments provide intelligence to the orchestrator for automatic scaling and optimized migration of containers between compute nodes and then evaluate the automatic container scaling and migration interventions.

Current container orchestration tools, such as, for example, Kubernetes, Docker Swarm, and the like, are driven by static user-defined policies and are not intelligent enough to make efficient container scaling decisions or optimal migration of containers. Illustrative embodiments take into account that these current container orchestration tools perform scale up or scale down of containers at run time without anticipating future load and do not perform automated migration of containers to reduce network latency. To address these issues, illustrative embodiments forecast container scaling and optimal container migration using machine learning and then evaluate these interventions. The machine learning component of illustrative embodiments analyzes and assesses intra-node features and inter-node features of microservices to determine efficient container orchestration in an automated manner.

For example, illustrative embodiments perform synchronized and optimized orchestration of automated scaling of containers on compute nodes via proactive forecasting, automated migration of containers based on microservice similarity analysis, and automatic evaluation of the machine learning component's interventions of container scaling and migration. Illustrative embodiments extract and analyze intra-node features and inter-node features corresponding to microservices. Illustrative embodiments utilize the extracted intra-node features to proactively forecast the number of containers required (i.e., scaling the number of containers) to meet future load of microservices. Illustrative embodiments utilize the extracted inter-node features to assess similarity between microservices to identify which containers to migrate to reduce the network latency.

Thus, illustrative embodiments provide one or more technical solutions that overcome a technical problem with automatically performing container orchestration to meet predicted future microservice workload demand. As a result, these one or more technical solutions provide a technical effect and practical application in the field of container-based microservices.

Figure 5:
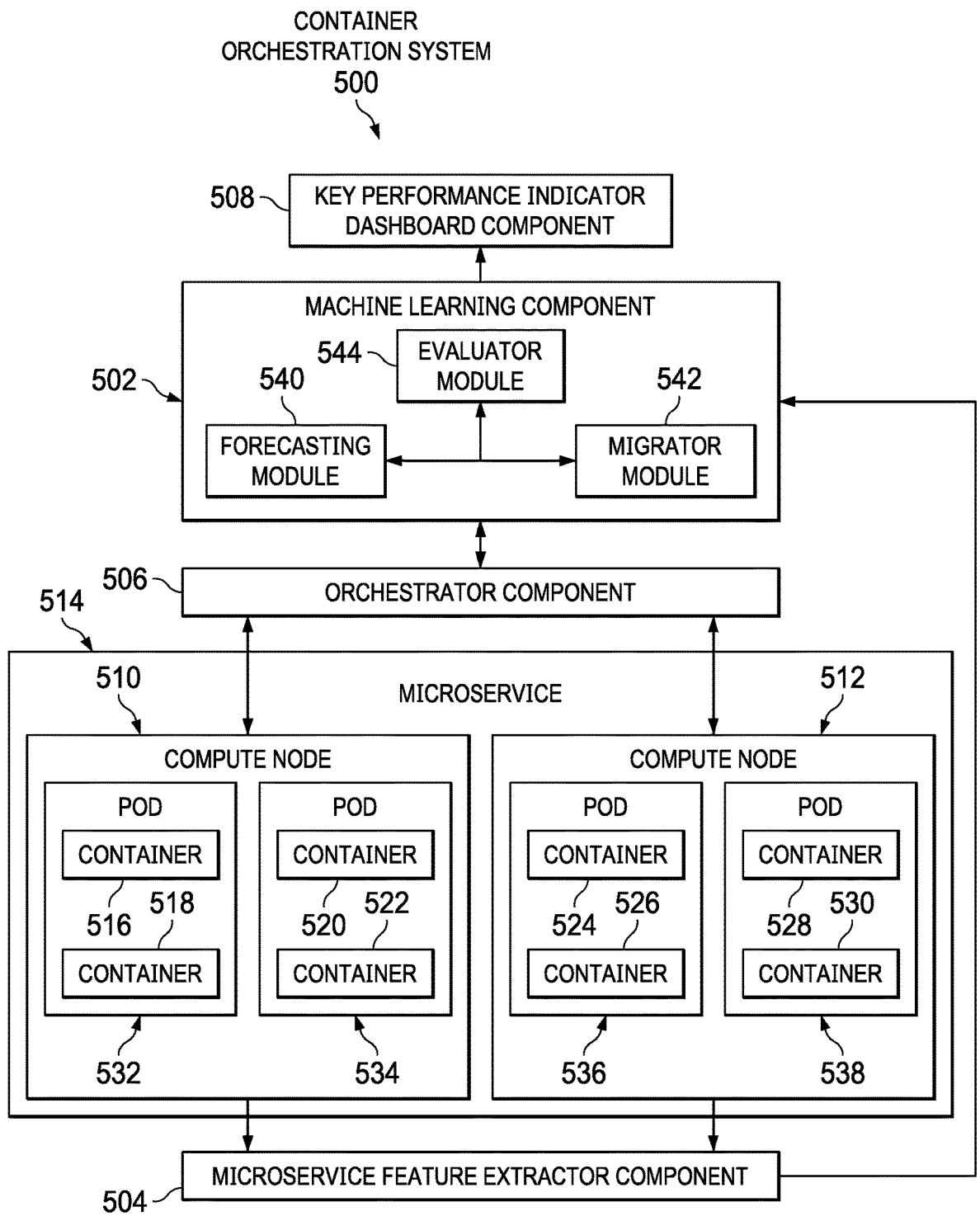
FIG. 5 is a diagram illustrating an example of a container orchestration system in accordance with an illustrative embodiment.

With reference now to FIG. 5, a diagram illustrating an example of a container orchestration system is depicted in accordance with an illustrative embodiment. Container orchestration system 500 may be implemented in a network of data processing systems, such as network data processing system 100 in FIG. 1. Container orchestration system 500 is a system of hardware and software components for automatically orchestrating containers for a plurality of different microservices by assessing intra-node and inter-node features of the plurality of different microservices and then assessing results of the container orchestration.

In this example, container orchestration system 500 includes machine learning component 502, microservice feature extractor component 504, orchestrator component 506, key performance indicator dashboard component 508, compute node 510, and compute node 512. However, it should be noted that container orchestration system 500 is intended as an example only and not as a limitation on illustrative embodiments. In other words, container orchestration system 500 may include more or fewer components than shown. For example, one or more components may be combined into one component, a component may be divided into two or more components, components not shown may be added, and the like. Also, compute node 510 and compute node 512 may each represent a plurality of compute nodes.

Compute nodes 510 and 512 are the actual infrastructure provisioned to host containers 516, 518, 520, 522, 524, 526, 528, and 530. Compute node 510 and compute node 512 run microservice 514. Microservice 514 is a container-based microservice. Also, microservice 514 may represent one respective microservice of a plurality of different microservices managed by machine learning component 502.

Microservice 514 is a loosely coupled service focused on performing a single business task and can be scaled both horizontally and vertically. Microservice 514 is contained in such a way that microservice 514 can provide efficient computation with regard to workload management. Microservice 514 is also fault-tolerant and self-healing (i.e., performs breakdown management). In addition, microservice 514 is capable of batch and real-time processing and is responsive, elastic, and resilient. All these attributes make microservice 514 a great candidate to be ported across compute nodes to be highly available.

In this example, compute node 510 runs a portion of microservice 514 using container 516 and container 518 of pod 532 and using container 520 and container 522 of pod 534. Compute node 512 runs another portion of microservice 514 using container 524 and container 526 of pod 536 and using container 528 and container 530 of pod 538.

Machine learning component 502 automatically determines the policies for dynamic container orchestration corresponding to microservice 514. Machine learning component 502 utilizes data regarding intra-node features, such as intra-node features 228 in FIG. 2, to proactively forecast the number of containers (i.e., the scaling up or the scaling down of the number of containers) needed within each of compute node 510 and compute node 512 for a predicted future workload of microservice 514. Machine learning component 502 also utilizes data regarding inter-node features, such as inter-node features 230 in FIG. 2, to migrate containers between compute node 510 and compute node 512 based on relationships and dependencies between microservice 514 and one or more other microservices of the plurality of different microservices to reduce or minimize latency in the network. In this example, machine learning component 502 includes forecasting module 549, migrator module 542, and evaluator module 544.

Machine learning component 502 utilizes microservice information extractor component 504 to identify, capture, and extract the intra-node feature data and the inter-node feature data, which represents all the needed information related to microservice 514. The intra-node feature data may include, for example, the number of containers running for microservice 514, the number of application programming interface requests per defined time interval to determine workload of microservice 514, utilization and workload capacity of each container corresponding to microservice 514 per the defined time interval, and the like. The inter-node feature data may include, for example, dependency between microservice 514 and one or more other microservices when microservice 514 calls another microservice, relationship between microservice 514 and one or more other microservices when the same application uses those particular microservices, geographic location of compute nodes 510 and 512 corresponding to containers 516-530 of microservice 514, network bandwidth and latency of connections corresponding to compute nodes 510 and 512, cost and configuration of compute nodes 510 and 512, and the like.

Machine learning component 502 utilizes forecasting module 540 to predict scaling up and scaling down of containers within compute nodes 510 and 512 according to predicted future workload of microservice 514. Forecasting module 540 uses time series forecasting models based on the intra-node feature data to predict the number of required containers to match the predicted future workload of microservice 514. For example, forecasting module 540 may utilize an auto-regressive integrated moving average (ARIMA) as a forecasting model. ARIMA is a way of modeling time series data for forecasting (i.e., for predicting future points in the time series). An ARIMA model is a particular type of regression model in which the dependent variable has been stationarized. The independent variables are all lags of the dependent variable and/or lags of the errors, so it is straightforward in principle to extend an ARIMA model to incorporate information provided by leading key performance indicators and other exogenous variables. Essentially, forecasting module 540 adds one or more regressors to the forecasting equation below:

$$\hat{Y}_t = \mu + \phi_1 Y_{t-1} - \theta_1 e_{t-1} + \beta(X_t - \phi_1 X_{t-1}),$$

where "Yt" is equal to the number of containers for the current time period, "Yt-1" is equal to the number of containers for the previous time period, "Xt" is equal to the number of application programming interface (API) requests for the current time period, and "Xt-1" is equal to the number of API requests for the previous time period. The forecasting equation above represents the current number of containers required at the current time period "t", which is predicted as a function of the number of containers at the previous time period "t-1" and number of API requests at the current time period "t" and the previous time period "t-1". This forecasting equation is a general embodiment such that new input parameters, such as, for example, capacity, utilization, and lag values for previous time periods "t-2", "t-3", and the like can be easily included. The forecasting model can be trained using a typical machine learning optimization algorithm (e.g., gradient descent) for increased prediction accuracy and decreased errors.

Forecasting module 540 predicts the number of containers required for microservice 514 using the trained forecasting model above. Forecasting module 540 identifies scaling labels and scaling values by comparing with the current number of containers. As an illustrative example, the current number of containers in compute node 510 is 4, the predicted number of containers required for the predicted future workload is 7. As a result, in this example the scaling label is scale "UP" and the scaling value is 3 (i.e., scale up the current number of 4 containers by adding 3 new containers to equal 7 total containers in compute node 510 to meet predicted future workload of microservice 514). Similarly, the scaling label may be scale "DOWN" and the scaling value may be 1 (i.e., scale down the current number of 4 containers by removing 1 container to equal 3 total containers in compute node 510 to meet predicted future workload of microservice 514). Based on the scaling label and value, orchestrator component 506 removes containers or adds new containers as required.

In other words, if the forecasted container value is higher than the current container value, then scale up is needed. Conversely, if the forecasted container value is lower than current container value, then scale down in needed. It should be noted that forecasting module 540 repeats this forecasting process for each respective microservice of the plurality of different microservices and assigns corresponding container scaling labels and values. Afterward, forecasting module 540 sends all scaling labels and values to orchestrator component 506, which removes unnecessary containers or generates new containers as needed. However, it should be noted that a scaling label may be "NO" and the scaling value 0, indicating no change in the current number of containers is needed for a particular compute node. Forecasting module 540 also calculates the cost associated with the scaling, which will be used by evaluator module 544.

After orchestrator component 506 performs scaling of the current number of containers based on the output of forecasting module 540, then machine learning component 502 utilizes migrator module 542 to optimize migration of containers between compute nodes corresponding to microservice 514 and containers corresponding to the plurality of other microservices. In other words, migrator module 542 identifies which containers need to be migrated and to where (i.e., to which compute nodes) within the network. For example, migrator module 542 identifies microservices having a network latency greater than a defined network latency threshold level. Migrator module 542 also identifies those microservices that are most similar to each other (e.g., those microservices that have a defined degree of similarity with one another based on extracted inter-node feature data). Migrator module 542 then instructs orchestrator component 506 to migrate containers corresponding to microservices having the defined degree of similarity to the same compute node to reduce network latency. Migrator module 542 also calculates the cost and microservice security associated with the migration, which also will be used by evaluator module 544.

Orchestrator component 506 defines how to deploy, monitor, and configure the containers using container orchestration policies. During run time, depending on the microservice workload, orchestrator component 506 scales up or scales down the containers on compute nodes and migrates containers between compute nodes based on container orchestration policies generated by and received from forecasting module 540 and migrator module 542 of machine learning component 502.

Evaluator module 544 assesses the container scaling and migration interventions performed by forecasting module 540 and migrator module 542. Evaluator module 544 may utilize, for example, a causal inference conditioning equation to measure the impact of each intervention, such as how container scaling affected cost and network latency and how container migration affected cost, network latency, and microservice security. For example, E (Key Performance Indicator/Intervention) is the key performance indicator (e.g., cost, latency, security, and the like) impact with the condition that some type of intervention is performed (e.g., container scaling and/or container migration).

Evaluator module 544 assesses the key performance indicator impact of forecasting module 540 using the following two equations:

Cost Delta value=$E$(Cost/Before Scaling)−$E$(Cost/After Scaling); and

Latency Delta value=$E$(Latency/Before Scaling)−$E$(Latency/After Scaling), where the Cost and Latency Delta values measure the impact of automated container scaling per the predictions of forecasting module 540.

Evaluator module 544 assesses the key performance indicator impact of migrator module 542 using the following three equations:

Cost Delta value=$E$(Cost/Before Migration)−$E$(Cost/After Migration);

Latency Delta value=$E$(Latency/Before Migration)−$E$(Latency/After Migration); and Security Delta value=$E$(Security/Before Migration)−$E$(Security/After Migration), where the Cost, Latency, and Security Delta values measure the impact of automated container migration per the microservice similarity analysis of migrator module 542.

Key performance indicator dashboard component 508 generates and displays a key performance indicator dashboard, which a user utilizes to visualize the output generated by evaluator module 544 (i.e., the different Delta values corresponding to forecasting module 540 and migrator module 542, respectively). As a result, the user can monitor the impact of container orchestration interventions of forecasting module 540 and migrator module 542 with regard to a set of selected key performance indicators, such as, for example, container scaling and migration costs, network latency, microservice security, and the like.

Figure 6:
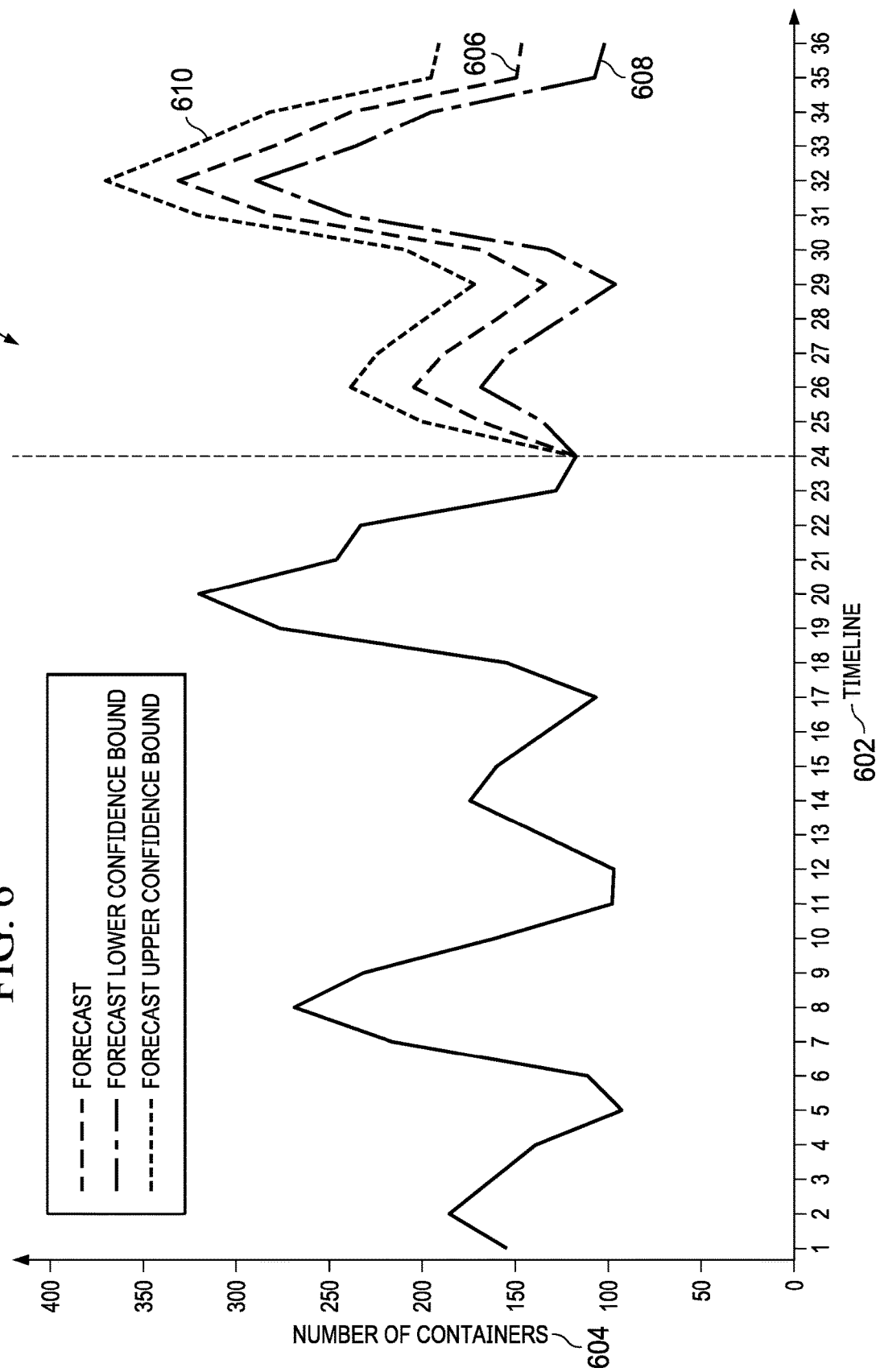
FIG. 6 is a diagram illustrating an example of a forecasting table in accordance with an illustrative embodiment.

With reference now to FIG. 6, a diagram illustrating an example of a forecasting table is depicted in accordance with an illustrative embodiment. Forecasting table 600 may be implemented in a forecasting module, such as, for example, forecasting module 540 in FIG. 5. Forecasting table 600 includes x-axis timeline 602 and y-axis number of containers 604.

Timeline 602 is a user-defined window of time and is adjustable. In other words, the units of timeline 602 may be, for example, hours, days, weeks, months, or the like, which are defined by the user depending on what window of time the user wants the forecasting module to analyze for making a prediction of future microservice workload using a time series forecasting model. Number of containers 604 indicate the number of containers currently needed by the microservice up to unit "24" of timeline 602 and thereafter indicating the predicted number of containers needed by the microservice (i.e., forecast 606). Forecasting table 600 also shows forecast lower confidence bound 608 and forecast upper confidence bound 610 corresponding to forecast 606.

Figure 7:
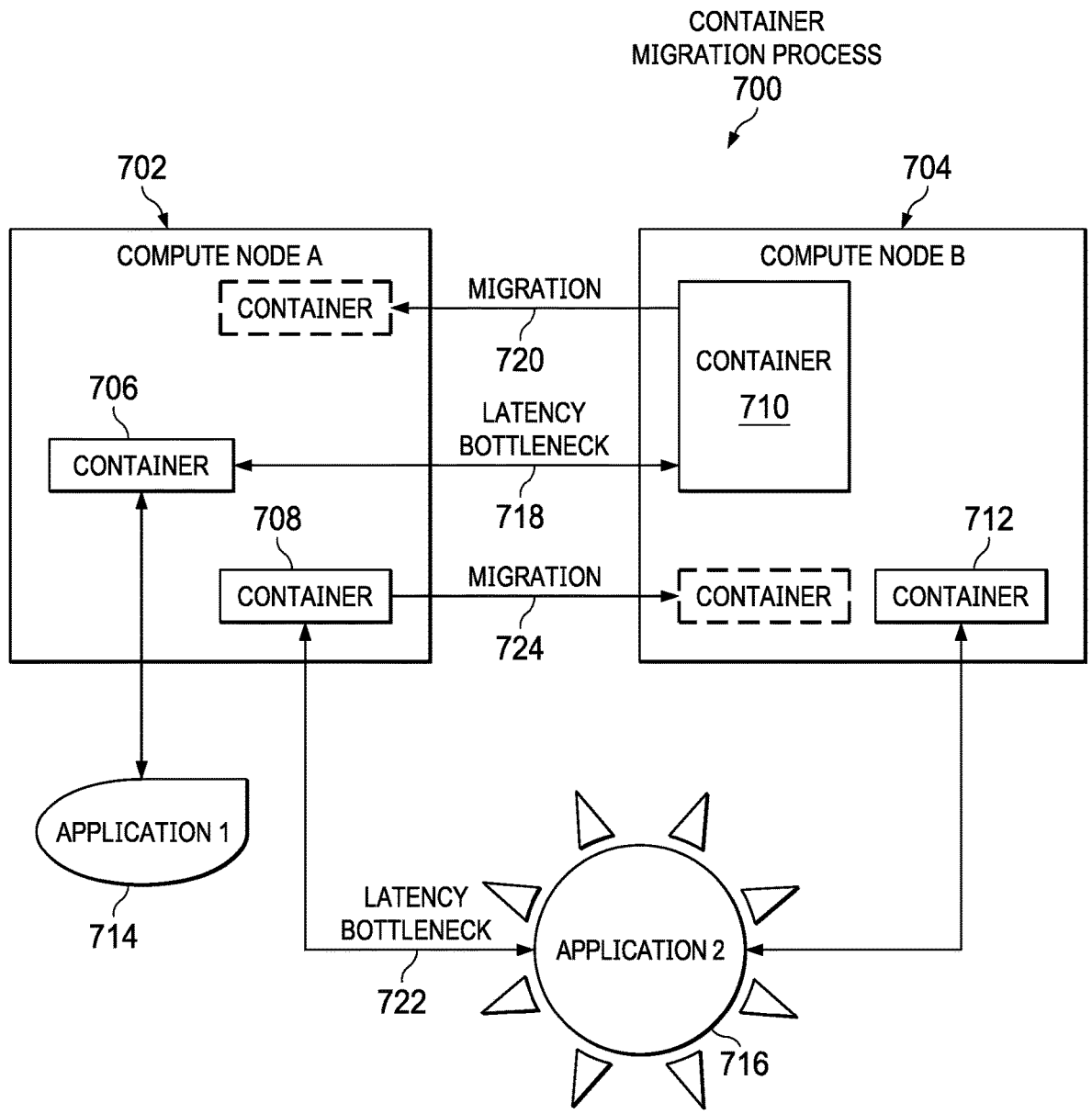
FIG. 7 is a diagram illustrating an example of a container migration process in accordance with an illustrative embodiment.

With reference now to FIG. 7, a diagram illustrating an example of a container migration process is depicted in accordance with an illustrative embodiment. Container migration process 700 may be implemented in a migration module, such as, for example, migration module 542 of FIG. 5. In this example, container migration process 700 is performed by the migration module between compute node A 702 and compute node B 704. However, it should be noted that the migration module may perform container migration process 700 between any number of compute nodes.

Also in this example, compute node A 702 includes container 706 and container 708 and compute node B 704 includes container 710 and container 712. However, it should be noted that compute node A 702 and compute node B 704 may include any number of containers. Further in this example, container 706 is used by application 1 714 and containers 708 and 712 are used by application 716.

Furthermore in this example, latency bottleneck 718 exists between containers 706 and 710. As a result, the migration module determines that container 710 needs to be migrated from compute node B 704 to compute node A 702 to reduce the network latency caused by latency bottleneck 718. Consequently, the migration module directs an orchestrator component, such as, for example, orchestrator component 506 in FIG. 5, to perform migration 720 of container 710 to compute node A 702. In addition, latency bottleneck 722 exists between container 708 and application 2 716. As a result, the migration module determines that container 708 needs to be migrated from compute node A 702 to compute node B 704 to reduce the network latency caused by latency bottleneck 722. Consequently, the migration module directs the orchestrator component to perform migration 724 of container 708 to compute node B 704.

With reference now to FIG. 8, a diagram illustrating an example of a container migration identification table is depicted in accordance with an illustrative embodiment. Container migration identification table 800 may be implemented in a migration module, such as, for example, migration module 542 of FIG. 5.

In this example, container migration identification table 800 includes microservice 802, dependency 804, relationship 806, compute node 808, network latency 810, and shared data attribute 812. Microservice 802 identifies each respective microservice. Dependency 804 identifies dependencies between certain microservices. Relationship 806 identifies relationships between certain microservices based on applications. In other words, different microservices are connected at the application level. Compute node 808 identifies a particular compute node in the network associated with a particular microservice. Network latency 810 identifies an amount of network latency associated with each particular microservice. Shared data attribute 812 identifies information accessed by a particular microservice. Data sharing between different microservices is accommodated via a shared database containing both static and mutable data and the different microservices access required data from the shared database.

In this example, container migration identification table 800 shows three microservices: MS-A, MS-B, and MS-X. Container migration identification table 800 also shows their respective dependencies, applications, node, and network latency. The migration module uses dependency 804, application information in relationship 806, and shared data attribute 812 information accessed in and out of a respective microservice to identify the similarity between two microservices.

The migration module may utilize similarity computation 814, such as, for example, cosine similarity, to determine microservice similarity. In this example, the migration module calculates the similarity computation for microservice A (MS-A) and microservice B (MS-B) as Similarity (MS-A, MS-B)=0.95. In other words, MS-A and MS-B have a 95% similarity, which is indicated on container migration identification table 800 as "SIMILAR". In addition, the migration module calculates the similarity computation for MS-B and microservice X (MS-X) as Similarity (MS-B, MS-X) =0.30. In other words, MS-B and MS-X only have a 30% similarity. Container migration identification table 800 also indicates that MS-A should be migrated from NODE-A to NODE-C to reduce network latency.

Figure 9A:
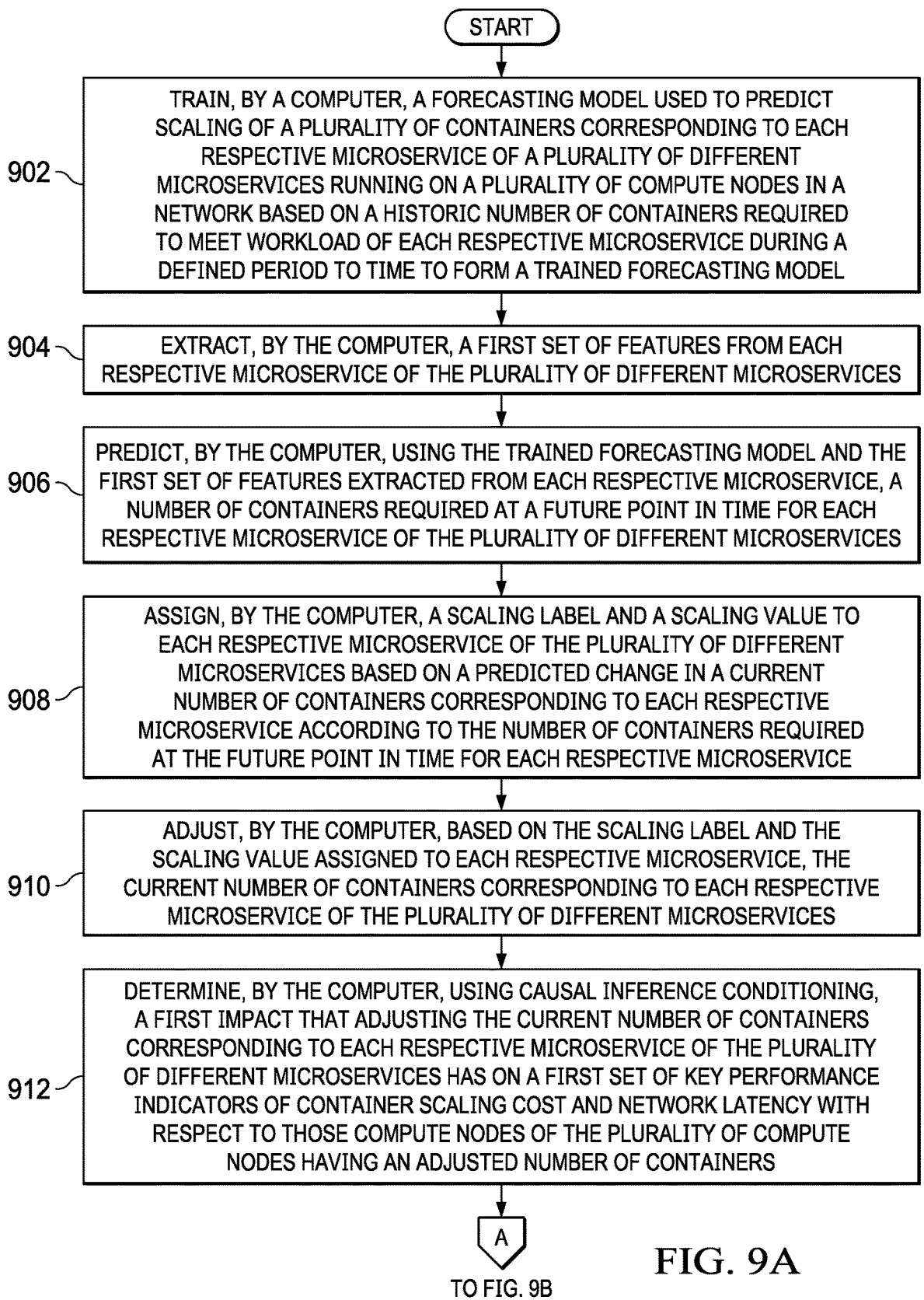
FIGS. 9A-9B are a flowchart illustrating a process for forecasting container scaling and migration of container-based microservices in accordance with an illustrative embodiment.
Figure 9B:
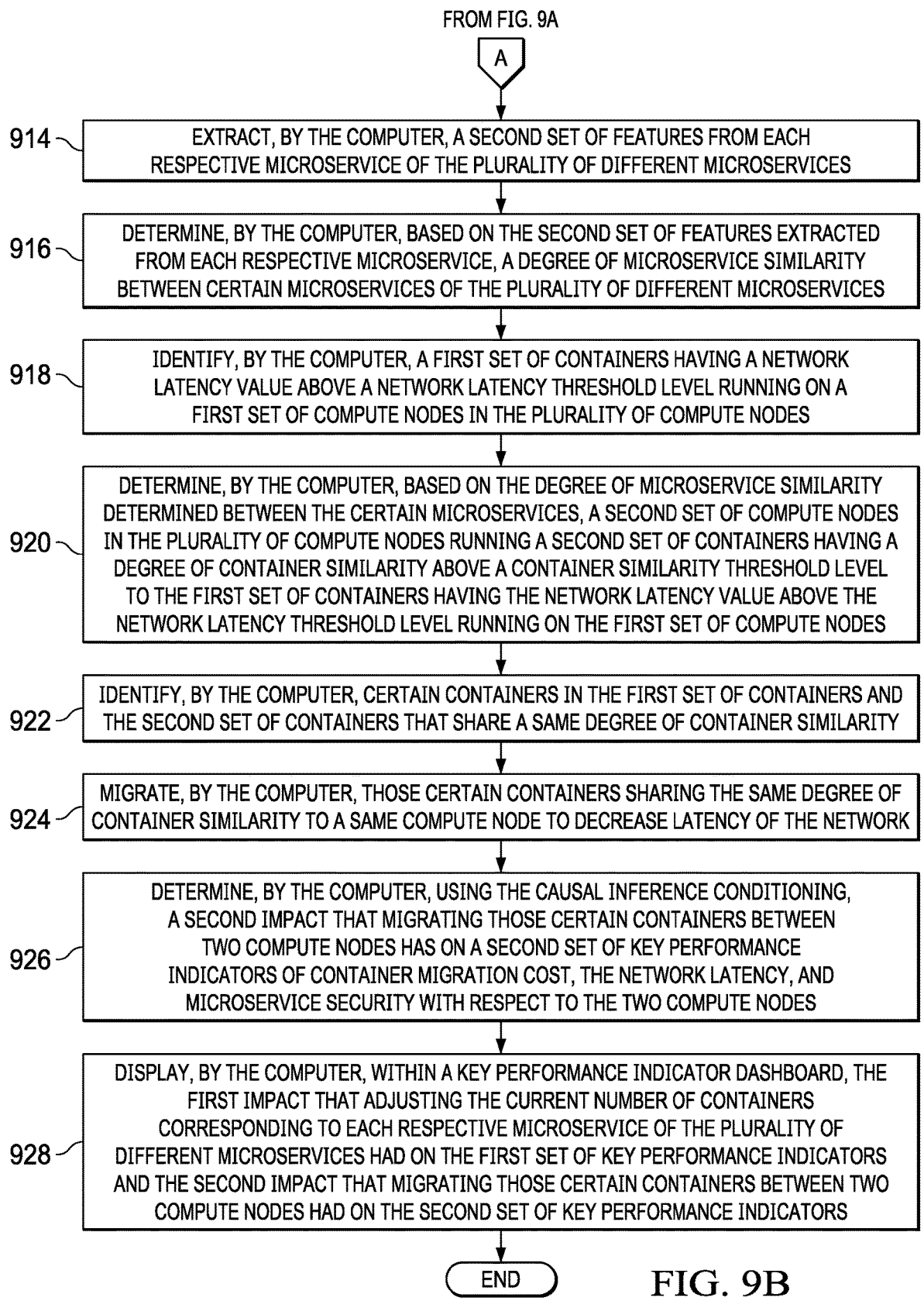

With reference now to FIGS. 9A-9B, a flowchart illustrating a process for forecasting container scaling and migration of container-based microservices is shown in accordance with an illustrative embodiment. The process shown in FIGS. 9A-9B may be implemented in a computer, such as, for example, server 104 in FIG. 1 or data processing system 200 in FIG. 2. For example, the process shown in FIGS. 9A-9B may be implemented in machine learning component 218 in FIG. 2.

The process begins when the computer trains a forecasting model used to predict scaling of a plurality of containers corresponding to each respective microservice of a plurality of different microservices running on a plurality of compute nodes in a network based on a historic number of containers required to meet workload of each respective microservice during a defined period to time to form a trained forecasting model (step 902). The computer extracts a first set of features from each respective microservice of the plurality of different microservices (step 904). The first set of features are selected from a group consisting of: a first number of containers corresponding to each respective microservice of the plurality of different microservices running on the plurality of compute nodes during a current time period; at least one of a utilization and a workload capacity of the first number of containers corresponding to each respective microservice of the plurality of different microservices running on the plurality of compute nodes during the current time period; a second number of containers corresponding to each respective microservice of the plurality of different microservices previously running on the plurality of compute nodes during a previous time period; at least one of a utilization and a workload capacity of the second number of containers corresponding to each respective microservice of the plurality of different microservices running on the plurality of compute nodes during the previous time period; a first number of application programming interface requests for each respective microservice during the current time period; and a second number of application programming interface requests for each respective microservice during the current time period.

The computer, using the trained forecasting model and the first set of features extracted from each respective microservice, predicts a number of containers required at a future point in time for each respective microservice of the plurality of different microservices (step 906). The computer assigns a scaling label and a scaling value (e.g., scale up or scale down by a value of one, two, three, or the like) to each respective microservice of the plurality of different microservices based on a predicted change in a current number of containers corresponding to each respective microservice according to the number of containers required at the future point in time for each respective microservice (step 908). The computer, based on the scaling label and the scaling value assigned to each respective microservice, automatically adjusts the current number of containers corresponding to each respective microservice of the plurality of different microservices (step 910). Adjusting the current number of containers includes one of making no adjustments to the current number of containers, generating one or more additional containers for particular microservices having an assigned scaling label and scaling value indicating that a scaling up is required at the future point in time, and removing one or more current containers for particular microservices having an assigned scaling label and scaling value indicating that a scaling down is required at the future point in time.

The computer, using causal inference conditioning, determines a first impact that adjusting the current number of containers corresponding to each respective microservice of the plurality of different microservices has on a first set of key performance indicators of container scaling cost and network latency with respect to those compute nodes of the plurality of compute nodes having an adjusted number of containers (e.g., compute nodes having a scaled up number of containers and compute nodes having a scaled down number of containers) (step 912). The computer extracts a second set of features from each respective microservice of the plurality of different microservices (step 914). The second set of features is selected from a group consisting of: information regarding dependencies between particular microservices (e.g., which particular microservices make application programming interface calls to other microservices in the plurality of different microservices); information regarding relationships between particular microservices (e.g., which applications use the same microservices); information regarding geographic location corresponding to each container of the plurality of containers corresponding to each respective microservice of the plurality of different microservices (e.g., where each particular compute node running the plurality of containers corresponding to a same microservice in the plurality of different microservices are geographically located); and network bandwidth and latency parameters corresponding to each respective node in the plurality of compute nodes. The computer, based on the second set of features extracted from each respective microservice, determines a degree of microservice similarity between certain microservices of the plurality of different microservices (step 916).

The computer identifies a first set of containers having a network latency value above a network latency threshold level running on a first set of compute nodes in the plurality of compute nodes (step 918). The computer, based on the degree of microservice similarity determined between the certain microservices, determines a second set of compute nodes in the plurality of compute nodes running a second set of containers having a degree of container similarity above a container similarity threshold level to the first set of containers having the network latency value above the network latency threshold level running on the first set of compute nodes (step 920). The computer identifies certain containers in the first set of containers and the second set of containers that share a same degree of container similarity (step 922).

The computer migrates those certain containers sharing the same degree of container similarity to a same compute node to decrease latency of the network (step 924). The computer, using the causal inference conditioning, determines a second impact that migrating those certain containers between two compute nodes has on a second set of key performance indicators of container migration cost, the network latency, and microservice security with respect to the two compute nodes (step 926). The computer, within a key performance indicator dashboard, displays the first impact that adjusting the current number of containers corresponding to each respective microservice of the plurality of different microservices had on the first set of key performance indicators and the second impact that migrating those certain containers between two compute nodes had on the second set of key performance indicators (step 928). The process terminates thereafter.

Thus, illustrative embodiments of the present invention provide a computer-implemented method, computer system, and computer program product for automatically orchestrating containers by assessing intra-node and inter-node features of microservices and then assessing results of the container orchestration. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for automatically performing container scaling and migration for container-based microservices, the computer-implemented method comprising:

extracting, by a computer, a first set of features from each respective microservice of a plurality of different microservices;

predicting, by the computer, using a trained forecasting model and the first set of features extracted from each respective microservice, a number of containers required at a future point in time for each respective microservice of the plurality of different microservices;

assigning, by the computer, a scaling label and a scaling value to each respective microservice of the plurality of different microservices based on a predicted change in a current number of containers corresponding to each respective microservice according to the number of containers required at the future point in time for each respective microservice;

adjusting, by the computer, based on the scaling label and the scaling value assigned to each respective microservice, the current number of containers corresponding to each respective microservice of the plurality of different microservices automatically;

extracting, by the computer, a second set of features from each respective microservice of the plurality of different microservices; and determining, by the computer, based on the second set of features extracted from each respective microservice, a degree of microservice similarity between certain microservices of the plurality of different microservices.

2. The computer-implemented method of claim 1 further comprising:

identifying, by the computer, a first set of containers having a network latency value above a network latency threshold level running on a first set of compute nodes in a plurality of compute nodes; and determining, by the computer, based on the degree of microservice similarity determined between the certain microservices, a second set of compute nodes in the plurality of compute nodes running a second set of containers having a degree of container similarity above a container similarity threshold level to the first set of containers having the network latency value above the network latency threshold level running on the first set of compute nodes.

3. The computer-implemented method of claim 2 further comprising:

identifying, by the computer, certain containers in the first set of containers and the second set of containers that share a same degree of container similarity; and migrating, by the computer, those certain containers sharing the same degree of container similarity to a same compute node to decrease latency of a network.

4. The computer-implemented method of claim 3 further comprising:

determining, by the computer, using causal inference conditioning, a first impact that adjusting the current number of containers corresponding to each respective microservice of the plurality of different microservices has on a first set of key performance indicators with respect to those compute nodes of the plurality of compute nodes having an adjusted number of containers;

determining, by the computer, using the causal inference conditioning, a second impact that migrating those certain containers between two compute nodes has on a second set of key performance indicators with respect to the two compute nodes; and displaying, by the computer, within a key performance indicator dashboard, the first impact that adjusting the current number of containers corresponding to each respective microservice of the plurality of different microservices had on the first set of key performance indicators and the second impact that migrating those certain containers between two compute nodes had on the second set of key performance indicators.

5. The computer-implemented method of claim 1 further comprising:

training, by the computer, a forecasting model used to predict scaling of a plurality of containers corresponding to each respective microservice of a plurality of different microservices running on a plurality of compute nodes in a network based on a historic number of containers required to meet workload of each respective microservice during a defined period to time to form the trained forecasting model.

6. The computer-implemented method of claim 5, wherein the forecasting model is an auto-regressive integrated moving average model.

7. The computer-implemented method of claim 1, wherein the first set of features are selected from a group consisting of: a first number of containers corresponding to each respective microservice of the plurality of different microservices running on a plurality of compute nodes during a current time period, at least one of a utilization and a workload capacity of the first number of containers corresponding to each respective microservice of the plurality of different microservices running on the plurality of compute nodes during the current time period, a second number of containers corresponding to each respective microservice of the plurality of different microservices previously running on the plurality of compute nodes during a previous time period; at least one of a utilization and a workload capacity of the second number of containers corresponding to each respective microservice of the plurality of different microservices running on the plurality of compute nodes during the previous time period, a first number of application programming interface requests for each respective microservice during the current time period, and a second number of application programming interface requests for each respective microservice during the current time period.

8. The computer-implemented method of claim 1, wherein the second set of features is selected from a group consisting of: information regarding dependencies between particular microservices, information regarding relationships between particular microservices, information regarding geographic location corresponding to each container of a plurality of containers corresponding to each respective microservice of the plurality of different microservices, and network bandwidth and latency parameters corresponding to each respective node in a plurality of compute nodes.

9. The computer-implemented method of claim 1, wherein adjusting the current number of containers includes one of generating one or more additional containers for particular microservices having an assigned scaling label and scaling value indicating that a scaling up is required at the future point in time and removing one or more current containers for particular microservices having an assigned scaling label and scaling value indicating that a scaling down is required at the future point in time.

10. A computer system for automatically performing container scaling and migration for container-based microservices, the computer system comprising:
  a bus system;
  a storage device connected to the bus system, wherein the storage device stores program instructions; and
  a processor connected to the bus system, wherein the processor executes the program instructions to:
    extract a first set of features from each respective microservice of a plurality of different microservices;
    predict, using a trained forecasting model and the first set of features extracted from each respective microservice, a number of containers required at a future point in time for each respective microservice of the plurality of different microservices;
    assign a scaling label and a scaling value to each respective microservice of the plurality of different microservices based on a predicted change in a current number of containers corresponding to each respective microservice according to the number of containers required at the future point in time for each respective microservice;
    adjust, based on the scaling label and the scaling value assigned to each respective microservice, the current number of containers corresponding to each respective microservice of the plurality of different microservices automatically;
    extract a second set of features from each respective microservice of the plurality of different microservices; and
    determine, based on the second set of features extracted from each respective microservice, a degree of microservice similarity between certain microservices of the plurality of different microservices.

11. The computer system of claim 10, wherein the processor further executes the program instructions to:
    identify a first set of containers having a network latency value above a network latency threshold level running on a first set of compute nodes in a plurality of compute nodes; and
    determine, based on the degree of microservice similarity determined between the certain microservices, a second set of compute nodes in the plurality of compute nodes running a second set of containers having a degree of container similarity above a container similarity threshold level to the first set of containers having the network latency value above the network latency threshold level running on the first set of compute nodes.

12. The computer system of claim 11, wherein the processor further executes the program instructions to:
    identify certain containers in the first set of containers and the second set of containers that share a same degree of container similarity; and
    migrate those certain containers sharing the same degree of container similarity to a same compute node to decrease latency of a network.

13. The computer system of claim 12, wherein the processor further executes the program instructions to:
    determine, using causal inference conditioning, a first impact that adjusting the current number of containers corresponding to each respective microservice of the plurality of different microservices has on a first set of key performance indicators with respect to those compute nodes of the plurality of compute nodes having an adjusted number of containers;
    determine, using the causal inference conditioning, a second impact that migrating those certain containers between two compute nodes has on a second set of key performance indicators with respect to the two compute nodes; and
    display, within a key performance indicator dashboard, the first impact that adjusting the current number of containers corresponding to each respective microservice of the plurality of different microservices had on the first set of key performance indicators and the second impact that migrating those certain containers between two compute nodes had on the second set of key performance indicators.

14. A computer program product for automatically performing container scaling and migration for container-based microservices, the computer program product comprising a computer readable storage medium having program instructions embodied therewith, the program instructions executable by a computer to cause the computer to perform a method of:
    extracting, by the computer, a first set of features from each respective microservice of a plurality of different microservices;
    predicting, by the computer, using a trained forecasting model and the first set of features extracted from each respective microservice, a number of containers required at a future point in time for each respective microservice of the plurality of different microservices;
    assigning, by the computer, a scaling label and a scaling value to each respective microservice of the plurality of different microservices based on a predicted change in a current number of containers corresponding to each respective microservice according to the number of containers required at the future point in time for each respective microservice;
    adjusting, by the computer, based on the scaling label and the scaling value assigned to each respective microservice, the current number of containers corresponding to each respective microservice of the plurality of different microservices automatically;

extracting, by the computer, a second set of features from each respective microservice of the plurality of different microservices; and determining, by the computer, based on the second set of features extracted from each respective microservice, a degree of microservice similarity between certain microservices of the plurality of different microservices.

15. The computer program product of claim 14 further comprising:

identifying, by the computer, a first set of containers having a network latency value above a network latency threshold level running on a first set of compute nodes in a plurality of compute nodes; and determining, by the computer, based on the degree of microservice similarity determined between the certain microservices, a second set of compute nodes in the plurality of compute nodes running a second set of containers having a degree of container similarity above a container similarity threshold level to the first set of containers having the network latency value above the network latency threshold level running on the first set of compute nodes.

16. The computer program product of claim 15 further comprising:

identifying, by the computer, certain containers in the first set of containers and the second set of containers that share a same degree of container similarity; and migrating, by the computer, those certain containers sharing the same degree of container similarity to a same compute node to decrease latency of a network.

17. The computer program product of claim 16 further comprising:

determining, by the computer, using causal inference conditioning, a first impact that adjusting the current number of containers corresponding to each respective microservice of the plurality of different microservices has on a first set of key performance indicators with respect to those compute nodes of the plurality of compute nodes having an adjusted number of containers;

determining, by the computer, using the causal inference conditioning, a second impact that migrating those certain containers between two compute nodes has on a second set of key performance indicators with respect to the two compute nodes; and displaying, by the computer, within a key performance indicator dashboard, the first impact that adjusting the current number of containers corresponding to each respective microservice of the plurality of different microservices had on the first set of key performance indicators and the second impact that migrating those certain containers between two compute nodes had on the second set of key performance indicators.

\* \* \* \* \*